Patented Nov. 2, 1948

2,452,641

UNITED STATES PATENT OFFICE 2,452,641

IODIZED SALT COMPOSITION

William H. Engels, Westfield, N. J., assignor to Merck & Co., Inc., Rahway, N. J., a corporation of New Jersey No Drawing. Application March 23, 1946, Serial No. 656,786

6 Claims. (Cl. 99—143)

My invention is especially concerned with a new and improved form of iodized salt.

This invention relates, more especially, to new and improved compositions including common salt, i. e. sodium chloride, and an alkaline iodide. It is also directed to various dietary feed mixtures in which the common salt may be included together with a source of iodine such as potassium iodide, sodium iodide, calcium iodide, or ammonium iodide. These dietary feed mixtures may, of course, include various other substances such as limestone, various metal carbonates, bone meal, etc.

Iodine is now regarded as an essential food element in order to prevent or combat common goiter or enlarged thyroid gland. During recent years, since the necessity for this material in the diet has been appreciated, it has been found most practical to incorporate the iodine in the common salt which is employed separately as a dietary flavoring material, or which is admixed with other materials to form a dietary foodstuff for both animal and human consumption.

When iodine has been incorporated in salt, usually in the form of an alkaline iodine such as potassium iodine, difficulty has been encountered in that the iodine in the mixture becomes unstable, the salt gradually losing its iodine content upon storage. By the time the salt reaches the consumer all, or a great part, of its iodine content may have been lost. Although there are various theories as to the cause of the iodine loss upon storage, and I do not of course wish to be held to any particular theory, it has generally been thought that oxidation plays a large part in rendering the iodine unstable. Oxidation of the alkaline iodide in the salt results in its conversion into free iodine in the elemental state, in which form it readily leaves the salt. Oxidation is usually brought about by many substances ordinarily present in salt, such as various metal compounds, or it may be brought about by air or by photochemical oxidation.

Various attempts have been made to solve this problem of iodine loss from salt, and from mixtures containing iodized salt upon storage, but such attempts have been generally not very successful in that they require the incorporation in the salt or salt mixture of substances undesirable in a product intended for human or animal consumption. For example, the incorporation of various reducing agents in the iodized salt, or iodized salt mixture, to prevent the loss of iodine therefrom has been proposed but, in practice, the use of reducing agents has not proven uniformly successful. Moreover, many of the reducing agents proposed are either toxic in greater or lesser degree, or of such character to render their presence in a food product undesirable.

I have now found that the incorporation of a small amount of activated carbon in iodized salt will prevent the loss of iodine from the salt; or from dietary mixtures or foodstuffs containing the iodized salt, upon storage. The activated carbon may be any commercially available activated carbon product such as carbon black, or any of the various activated carbons sold commercially for adsorption purposes under various trade-mark names. The amount of activated carbon found effective in preventing loss of iodine from the salt or salt mixture may be very small, amounts as low as 0.1%, based on the weight of the salt, being entirely effective. Of course, if the iodine content of the salt is fairly high it may be necessary to increase the amount of activated carbon, but I have found that amounts from 10 to 20 times the weight of iodine present are generally ample to prevent loss of iodine.

When activated carbon is incorporated in the usual iodized salt sold commercially for the purpose of animal feeding, such salt contains, in addition to the sodium chloride, an alkaline iodide such as potassium iodide, and it may or may not contain starch. Of course commercial salt is not pure sodium chloride, but may also contain various metallic compounds, especially metallic iron compounds. Salts of copper and manganese may also be present. Frequently in addition to the inorganic iodide and starch, commercial salt mixtures which are sold as iodized salt will contain other ingredients, such as calcium salts, as well as agents to prevent or inhibit caking.

When activated carbon it utilized, in accordance with my invention, to prevent iodine loss upon storage from dietary food mixtures including iodized salt, or containing iodized salt as a major ingredient, such mixtures will usually contain, in addition to the iodized salt, inorganic substances such as limestone, lime, other calcium salts, sulfur, bone meal, phosphates, etc. The amount of activated carbon incorporated with this composition in order to prevent loss of iodine from the iodized salt of the dietry food mixture upon storage will ordinarily not exceed 1%, based on the weight of the iodized salt, and may, in many cases, be much less than this. Amounts as low as 0.1% have been found effective in many instances.

It should be understood that the iodine content of iodized salt is ordinarily supplied by the incorporation of various inorganic iodides therein. Potassium iodide is frequently incorporated as the iodine source. Under some circumstances the incorporation of calcium iodide is preferable, since it tends to prevent caking of the salt, and other iodides, such as sodium iodide or ammonium iodide are sometimes used. In the appended claims the term inorganic iodide is intended to include all sources of iodine as now incorporated in commercial iodized salt mixtures to impart an iodine content thereto.

Various changes and modifications may be made in my invention as described without departing from the scope thereof. Such changes and modifications, as are within the purview of the appended claims, are to be regarded as within the limits of my invention.

I claim:

1. An iodized salt composition, stabilized against iodine loss on storage, comprising common salt, an inorganic iodide, and activated carbon.

2. An iodized salt composition, stabilized against iodine loss on storage, comprising common salt, an inorganic iodide, and carbon black.

3. An iodized salt composition, stabilized against iodine loss on storage, which comprises common salt, an inorganic iodide, activated carbon, and starch.

4. An iodized salt composition, stabilized against iodine loss upon storage, which comprises common salt, potassium iodide, and activated carbon.

5. An iodized salt composition, stabilized against iodine loss upon storage, which comprises common salt, sodium iodide and activated carbon.

6. An iodized salt composition, stabilized against iodine loss upon storage, which comprises common salt, calcium iodide and activated carbon.

WILLIAM H. ENGELS.

REFERENCES CITED

The following references are of record in the file of this patent:

UNITED STATES PATENTS

| Number | Name | Date |
|---|---|---|
| 2,144,150 | Hart et al. | Jan. 17, 1939 |
| 2,146,958 | Kotera | Feb. 14, 1939 |

FOREIGN PATENTS

| Number | Country | Date |
|---|---|---|
| 348,184 | Great Britain | May 8, 1931 |